(12) United States Patent
Chandrasekaran

(10) Patent No.: US 10,068,226 B2
(45) Date of Patent: Sep. 4, 2018

(54) SYSTEM FOR AUTHORIZATION AND INSTANT INTEGRATION OF CREDIT CARD TO DIGITAL WALLET

(71) Applicant: BANK OF AMERICA CORPORATION, Charlotte, NC (US)

(72) Inventor: Vignesh Chandrasekaran, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 590 days.

(21) Appl. No.: 14/674,316

(22) Filed: Mar. 31, 2015

(65) Prior Publication Data

US 2016/0292673 A1 Oct. 6, 2016

(51) Int. Cl.
- *G06Q 20/36* (2012.01)
- *G06Q 20/40* (2012.01)
- *G06F 21/56* (2013.01)
- *G06Q 20/38* (2012.01)
- *G06Q 20/24* (2012.01)

(52) U.S. Cl.
CPC ....... *G06Q 20/3674* (2013.01); *G06F 21/566* (2013.01); *G06Q 20/24* (2013.01); *G06Q 20/385* (2013.01); *G06Q 20/40* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 8,819,774 B2 * | 8/2014 | Kononov | G06F 21/577 726/1 |
| 8,918,338 B1 * | 12/2014 | Bornhofen | G06Q 20/24 705/38 |
| 9,633,322 B1 * | 4/2017 | Burger | G06Q 10/0635 |
| 2014/0066015 A1 * | 3/2014 | Aissi | H04W 12/06 455/411 |
| 2015/0154588 A1 * | 6/2015 | Purves | G06Q 20/363 705/14.27 |

* cited by examiner

*Primary Examiner* — Steven S Kim
*Assistant Examiner* — Kristin D Sandoval
(74) *Attorney, Agent, or Firm* — Michael A. Springs; Moore & Van Allen PLLC; Nicholas C. Russell

(57) ABSTRACT

Embodiments of the invention are directed to a system, method, or computer program product for security confidence calculation for digital wallet integration. In this way, the invention provides instantaneous access to new payment methods, such as credit cards with prevention of misappropriation based on user device security confidence and token presentation. As such, the system allows for instant application approval, authorization, and instant integration of credit cards to a user's digital wallet. Thus allowing a user to instantaneously use the new credit card via his/her digital wallet without having to wait for the physical card to be received and activated.

17 Claims, 6 Drawing Sheets

SYSTEM FOR AUTHORIZATION AND INSTANT INTEGRATION OF CREDIT CARD TO DIGITAL WALLET

BACKGROUND

When a user applies for a new credit card, there is typically an application process followed by an approval process. Subsequently, after approval, the user may receive a physical copy of the credit card in the mail. The user may then activate the credit card for use. Once the user receives the physical copy of the card in the mail, the user may use the credentials on the physical card to input the card on the customer's mobile wallet.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a system that autogenerates a credit card upon approval decisions to a user digital wallet for instant use upon user device authentication. Thus, the system provides authorization and instant integration of credit cards to a user's digital wallet. Thus allowing a user to instantaneously use the new credit card via his/her digital wallet without having to wait for the physical card to be received and activated.

In some embodiments, the issuing financial institution may receive a user application for a new credit card via any channel, such as an electronic, mail, or via the banking network. In some embodiments, the system associated with the invention may be associated with the issuing financial institution and receive the user application for the new credit card. The financial institution may approve the application after the application is submitted, the approval may be based on standardized credit card application acceptance criteria. In some embodiments, this approval may be instantaneous upon receiving the application.

In some embodiments, once the system has approved the user for the new credit card, information about accessing and authorizing the use of the credit card via the user's digital wallet may be presented to the user. The presentation may be via the user's online or mobile banking interface or other electronic correspondence. In this way, the user may log into his/her online banking application using his/her user name and password authentication. Once the user is authenticated into an online banking platform, the system may provide information about accessing and authorizing the use of the credit card via the user's digital wallet instantaneously.

Upon requesting that the new credit card be implemented onto the user's digital wallet, the system may determine the device associated with the request and the device associated with the digital wallet. The device associated with the digital wallet, in some embodiments, may be a mobile phone or mobile computing device with mobile or digital wallet capabilities thereon. The device associated with the request may also be a mobile device, but could also include a desktop computer, bank branch computer, or the like. Furthermore, each device may include an identifier, such as a mobile telephone number, unique signature, or the like. The system may identify the digital wallet device of the user and any devices that the user has utilized to request the insertion of the new credit card on the digital wallet and/or any devices that the user has utilized to access his/her online banking application.

In some embodiments, the system may then initiate a security check on the devices. The security check generates a security confidence rating to confirm that the device requesting the new credit card to be implemented on the digital wallet and the device associated with the digital wallet are both devices associated with the user and are both not corrupted with viruses, malware, or the like. As such, the security check and subsequently generated security confidence rating ensures that misappropriation of the new credit card cannot occur. As such, the security check may, in some embodiments, access information about the requesting device and digital wallet device, based on the identifier of each device. The system may confirm the operating system of the device, the health of the device, and determine an IP address or location match between the devices the user uses to log into online banking applications and the requesting device.

In some embodiments, the security check will generate a security confidence rating that rates the security of authorizing the new credit card to the digital wallet. Once the security rating is above the required threshold, the system may allow a token to be provided to the digital wallet. In some embodiments, the system may provide the token to the digital wallet. In other embodiments, the network or credit card processing institution associated with the credit card. In some embodiments, the system may then provide the token to a user device. The token may be stored in the user device associated with the digital wallet, once received. The user device may store the token until the user accesses his/her online banking application and/or his/her digital wallet. In this way, the system provides a token for the acceptance and presentment of the new credit card on the digital wallet instantly. At that point, the credit card is functional on the digital wallet. As such, the user does not have to wait for a physical credit card to use the new card for transactions.

Embodiments of the invention relate to systems, methods, and computer program products for authorization and instant integration of a credit card to a digital wallet comprising: communicating information regarding acceptance of an application onto an online platform, wherein the online platform is accessible by a user via a username and password; receiving, based on communicating the information regarding acceptance of an application to an online platform, via a distributive network, a request from a user device for a token to be communicated to the user device for digital wallet integration; identifying, via a unique device identifier, the user device and one or more devices associated with the application; performing condition diagnostics on the user device and one or more devices associated with the application to confirm device health, wherein device health includes system checks for rooted or unrooted malware within the user device and one or more devices associated with the application; requesting generation of a token based on a security confidence rating calculated from the condition diagnostics, wherein the token comprises a credit card number, CVV number, and expiration date for digital wallet insertion of the accepted application; and storing the token in the user device memory for digital wallet integration and use for completing a transaction using the digital wallet.

In some embodiments, communicating the information regarding acceptance of an application onto an online platform occurs instantaneously with the acceptance, wherein the information regarding acceptance of the application comprises information about acceptance of a credit card application of the user.

In some embodiments, the invention further comprises receiving the application from the user via one or more electronic channels and approving the application instantaneously, wherein the application is an application for a new credit card.

In some embodiments, performing condition diagnostics further comprise determining the security confidence rating for integration of a new credit card associated with the application to the digital wallet, wherein the security confidence rating confirms co-localization of the user and the digital wallet and that no malware is present on the user device associated with the digital wallet.

In some embodiments, the operation of identifying, via a unique device identifier, the user device and one or more devices associated with the application includes identifying a telephone number associated with the user device.

In some embodiments, storing the token in the user device memory for digital wallet integration further comprises storing a virtual credit card associated with the approved application instantaneously after approval, such that no wait period is needed for use of the virtual credit card for a transaction.

In some embodiments, the online platform is an online banking platform displaying information about accounts associated with the user authorized to access the online platform.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
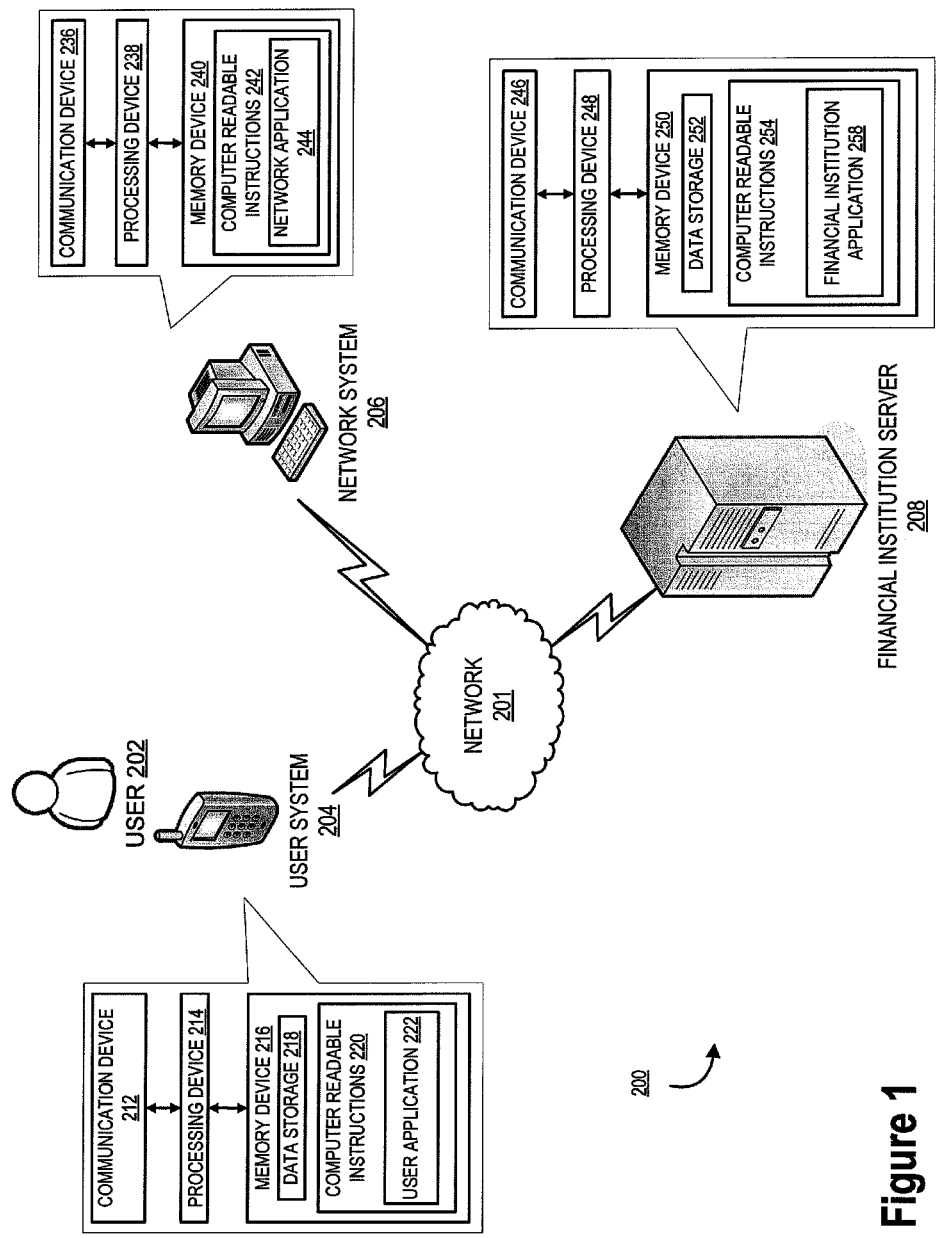
Figure 2:
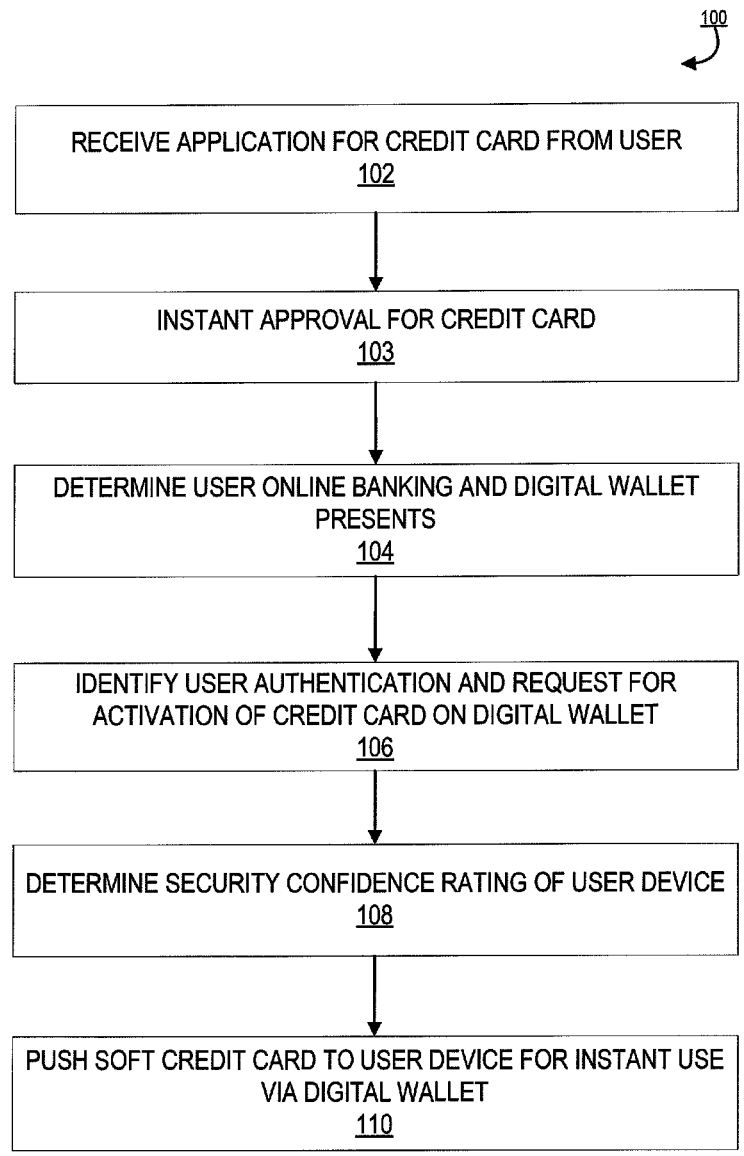
Figure 3:
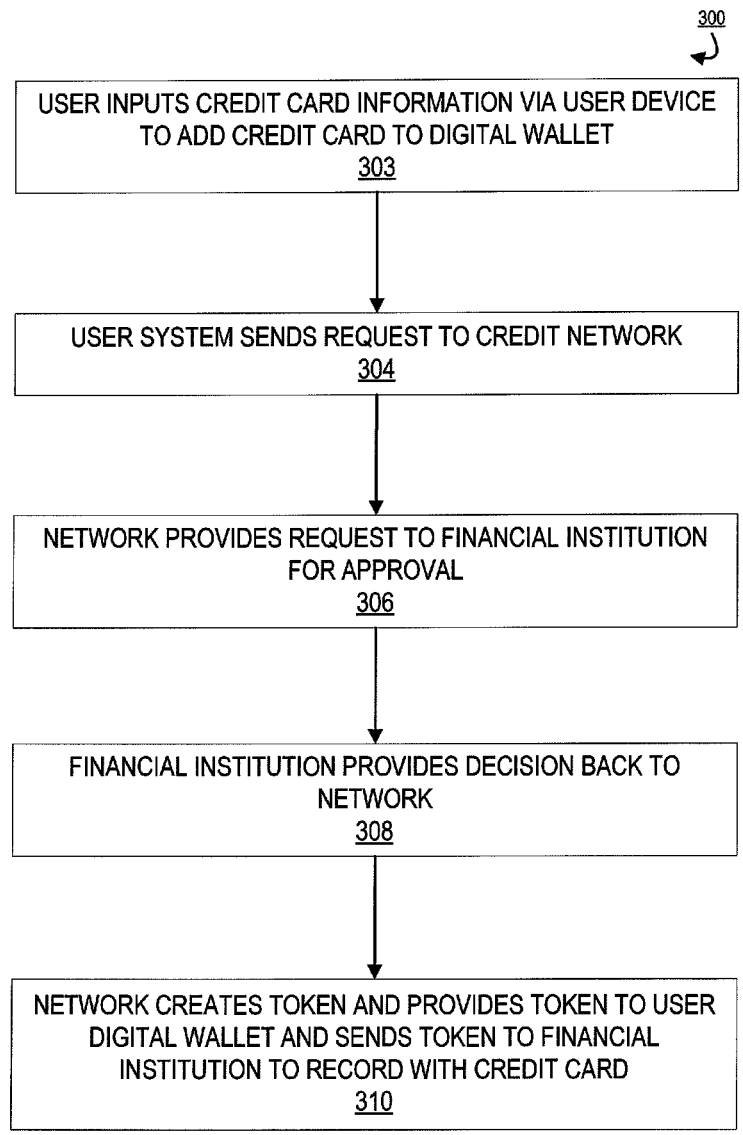
Figure 4:
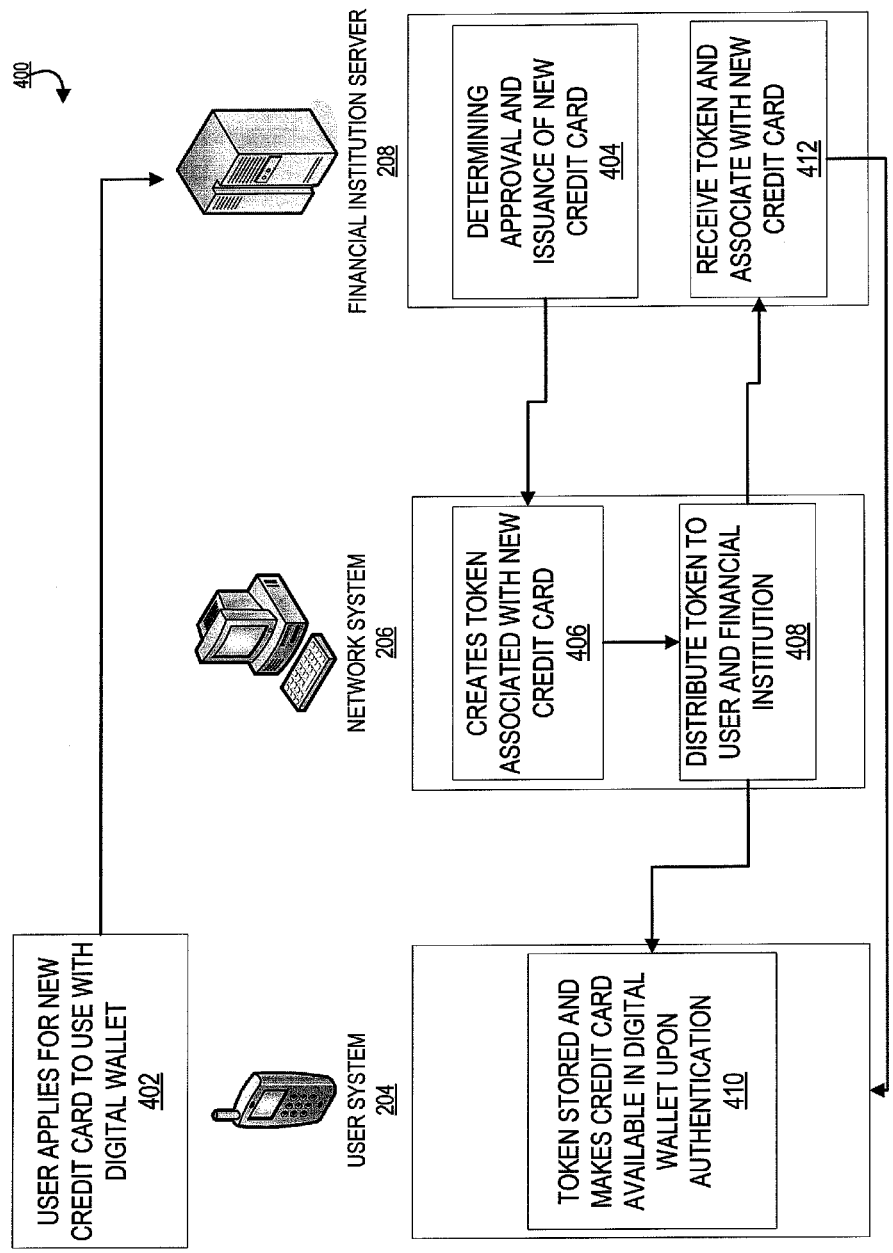
Figure 5:
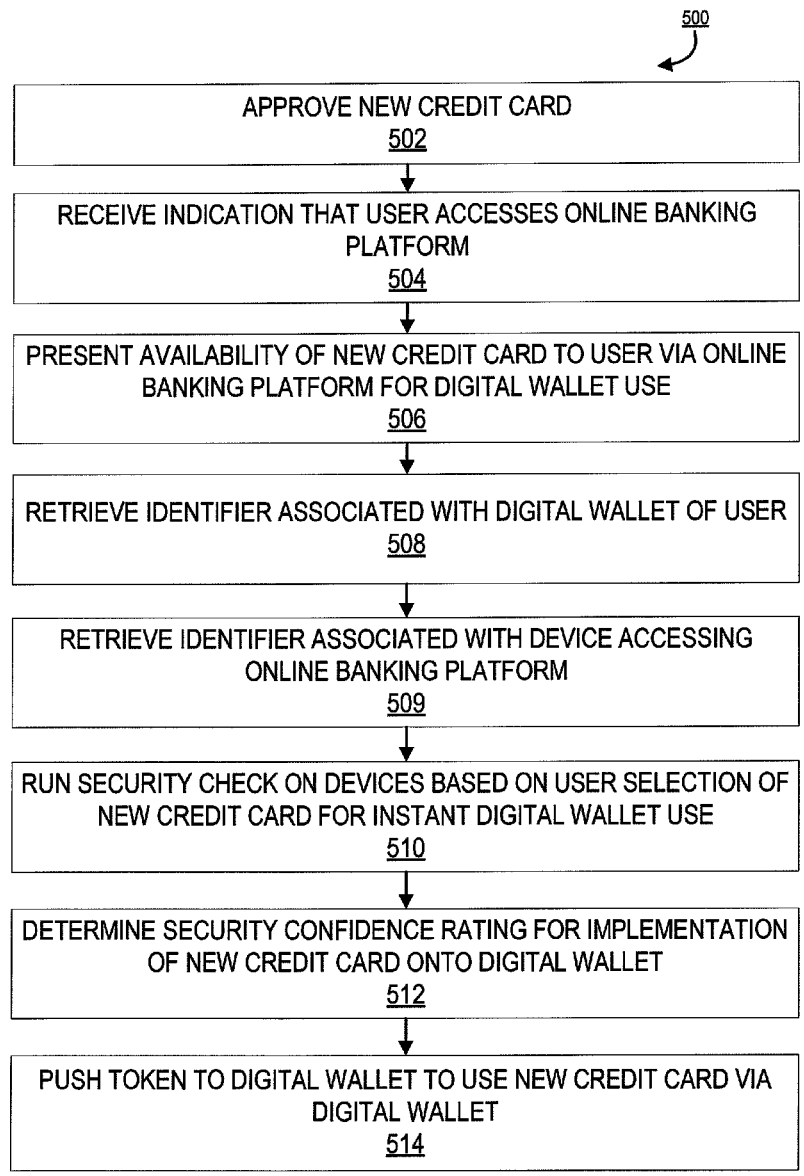
Figure 6:
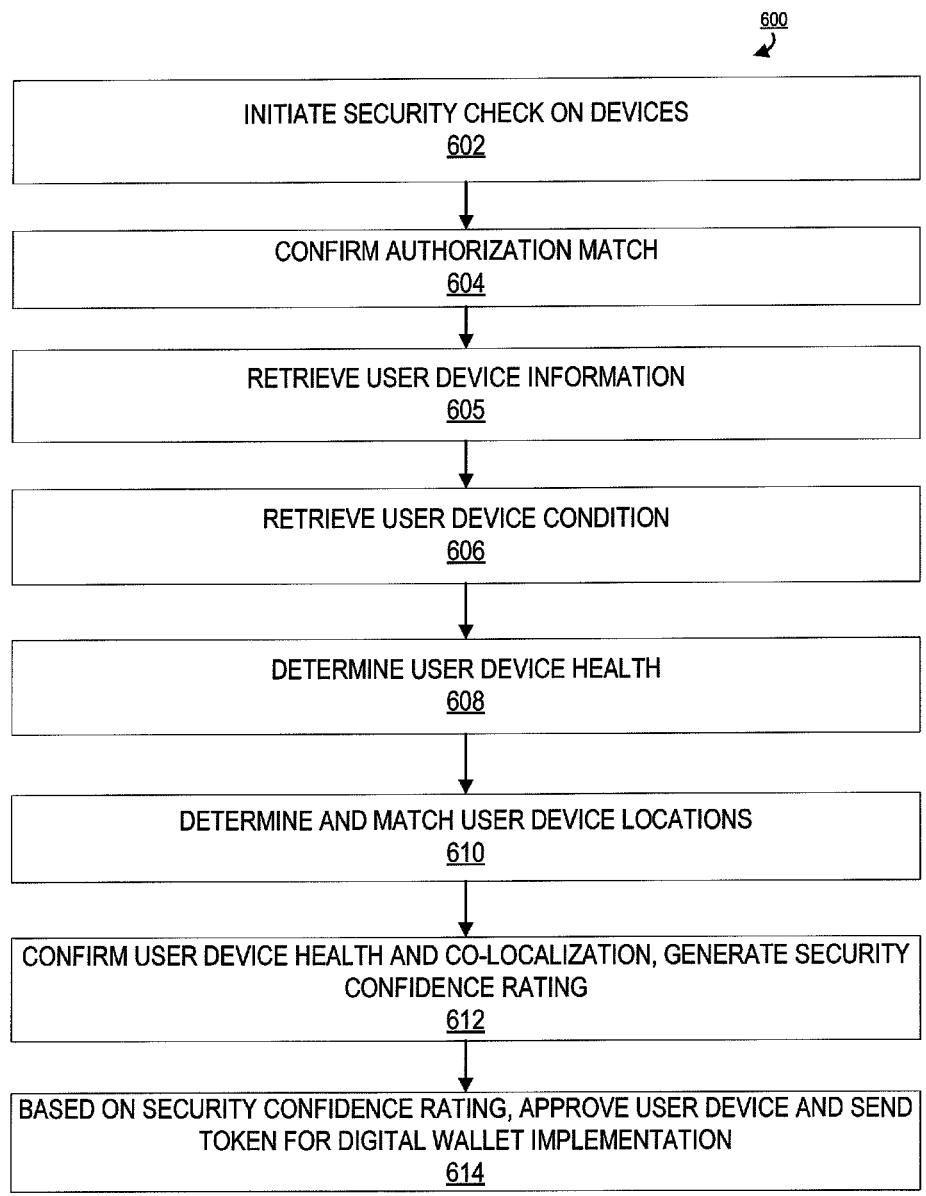

Having thus described embodiments of the invention in general terms, reference will now be made to the accompanying drawings, wherein:

FIG. 1 provides an authorization and instant integration to digital wallet system environment, in accordance with one embodiment of the present invention;

FIG. 2 provides a high level process flow illustrating the authorization and instant integration of a new credit card to a digital wallet process, in accordance with one embodiment of the present invention;

FIG. 3 provides a process map illustrating a standard insertion of a credit card to a digital wallet, in accordance with one embodiment of the present invention;

FIG. 4 provides a process map illustrating system integration of credit card insertion into digital wallet based on the authorization and instant integration to digital wallet system, in accordance with one embodiment of the present invention;

FIG. 5 provides a detailed process flow illustrating the authorization and instant integration of a new credit card to a digital wallet process, in accordance with one embodiment of the present invention; and FIG. 6 provides a process flow illustrating a security check and security confidence rating for integration of new credit card onto digital wallet, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may are associated with total spend item level affinity identification.

Presenting a credit card on a digital wallet may provide a visual bank or credit card to the customer. As referred to herein, the visual bank or credit card may refer to, but is not limited to, an electronic or digital transaction vehicle that can be used to transfer money, make a payment (for a service or a good), withdraw money, and similar or related transactions. Using an approved/authorized banking channel of communication, which may include making a phone call, accessing online banking, walking into a branch banking center, using an automatic teller machine, or the like, a user may indicate that an existing physical transaction card associated with one or more financial accounts of the user is misplaced, lost, or has been misappropriated. Once the user is authenticated via the authorized banking channel, a request may be submitted for the instance issuance of a credit card. In response to the request the system may issue the credit card directly to a mobile device of the user. In that way, the user may easily display and use the virtual credit card prior to receiving the physical card for conducting a transaction.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

Embodiments of the invention are directed to a system, method, or computer program product for a distributive network system with specialized data feeds associated with the distributive network and specific triggering events associated with the data feeds for authorizing and instantly integrating a newly approved credit card into a digital wallet As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

FIG. 1 illustrates an authorization and instant integration to digital wallet system environment 200, in accordance with one embodiment of the present invention. FIG. 1 provides the system environment 200 for which the distributive network system with specialized data feeds associated with the distributive network and specific triggering events associated with the data feeds for authorizing and instant integration of credit cards to digital wallets for instantaneous use immediately after application approval utilizing system determined security confidence ratings to confirm that the device requesting the new credit card to be implemented on the digital wallet and the device associated with the digital wallet are both devices associated with the user and are both not corrupted with viruses, malware, or the like.

FIG. 1 provides a unique system that includes specialized servers and system communicably linked across a distributive network of node required to provide authorization and instant integration of newly approved credit cards to a digital wallet based on security confidence determinations. The system, with its communicably linked diffusible network may, in some embodiments, improve a general computing device if utilized thereon by improving the ability for the computer device to access and securely present virtual credit cards on a digital wallet for transaction completion. Furthermore, in some embodiments, the system may be, as described below, run on a diffusion network of specialized nodes meant for authorizing and instant integration to a digital wallet.

As illustrated in FIG. 1, the financial institution server 208 is operatively coupled, via a network 201 to the user system 204, and to the network system 206. In this way, the financial institution server 208 can send information to and receive information from the user system 204 and the network system 206 to autogenerates a credit card upon approval decisions to a user digital wallet for instant use upon user device authentication. Thus, the system provides authorization and instant integration of credit cards to a user's digital wallet. Thus allowing a user to instantaneously use the new credit card via his/her digital wallet without having to wait for the physical card to be received and activated. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual consumer that is applying for or wishes to apply for a credit card. Furthermore, the user 202 is one or more individuals that may have an online banking presents and a digital wallet. The user 202 may make one or more transactions to purchase a product with a credit card via a digital wallet. In some embodiments, the purchase may be made by the user 202 using a user system 204.

FIG. 1 also illustrates a user system 204. The user system 204 generally comprises a communication device 212, a processing device 214, and a memory device 216. The user system 204 is a computing system that allows a user 202 to interact with the financial institution to apply for a credit card, access online banking applications, and utilize a digital wallet for transaction completion. The processing device 214 is operatively coupled to the communication device 212 and the memory device 216. The processing device 214 uses the communication device 212 to communicate with the network 201 and other devices on the network 201, such as, but not limited to the network system 206 and the financial institution server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may open a financial institution account, apply for credit cards, remotely communicate with the financial institution, authorize and complete a transaction, or complete a transaction using the user system 204 via a digital wallet. Furthermore, the user application 222 may receive a token from the financial institution server 208 or network system 206 and be stored on the memory device 216 of the user system 204. The user system 204 via the user application 222 may decrypt the token to access the credit card number, CVV number, expiration date, and/or other information required to complete a transaction via a virtual credit card on the digital wallet. The user system 204 may be, for example, a desktop personal computer, a mobile system, such as a cellular phone, smart phone, personal data assistant (PDA), laptop, or the like.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for approval of a credit card application, present approval to online banking application, receive request for virtual credit card to be on digital wallet, contact user system 204 for security confidence, push token to user system 204 for storage and decryption on user system 204 for use of credit card on digital wallet instantly, upon approval of credit card application.

In some embodiments, the financial institution application 258 may allow for approval of a credit card application. In some embodiments, the financial institution application 258 may receive an application for a new credit card via the network 201 from the user 202 via the user system 204. The financial institution application 258 may approve the application after the application is submitted based on a stored standardized credit card application acceptance criteria stored in the memory 250. In some embodiments, this approval by the financial institution application 258 may be instantaneous upon receiving the application.

In some embodiments, the financial institution application 258 may present approval to an online banking application associated with the user 202. As such, once the financial institution application 258 has approved the user 202 for the new credit card, the financial institution application 258 may provide information about accessing and authorizing the use of the credit card via the user's digital wallet. The financial institution application 258 may provide this information via an online banking interface associated with the financial institution server 208 and the user's accounts at the financial institution. As such, the financial institution application 258 may provide the user 202 with the information via communication over the network 201 via data feeds to the user system 204. Once the user 202 is authenticated into an online banking platform, the financial institution application 258 may provide information about accessing and authorizing the use of the credit card via the user's digital wallet instantaneously.

In some embodiments, the financial institution application 258 may receive request for virtual credit card to be on digital wallet. As such, the financial institution application 258 may receive network data feeds or communications from the user 202 via a user system 204 over the network 201 requesting that the new credit card be implemented onto the user's digital wallet.

In some embodiments, the financial institution application 258 may determine the unique identity of the user system 204 and/or other devices associated with the digital wallet requesting the credit card and contact the devices for security confidence. In some embodiments, the financial institution application 258 may communicate with the user system 204 and/or other systems to identify the unique identifier. The financial institution application 258 may then initiate a security check on the devices. The security check generates a security confidence rating to confirm that the device requesting the new credit card to be implemented on the digital wallet and the device associated with the digital wallet are both devices associated with the user and are both not corrupted with viruses, malware, or the like. As such, the financial institution application 258 communicates and provides codes for download on the user system 204 that maybe encrypted and subsequently decrypted by the user system 204 for system monitoring and malware searching. As such, the security check and subsequently generated security confidence rating ensures that misappropriation of the new credit card cannot occur. As such, the security check may, in some embodiments, provide code and/or access information about the requesting device and digital wallet device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the new credit card to the digital wallet.

In some embodiments, the financial institution application 258 may push a token to user system 204 for storage and decryption on user system 204 for use of credit card on digital wallet instantly, upon approval of credit card application. As such, once the financial institution application 258 determines a security rating for the requesting device is above the required threshold, the financial institution application 258 may generate and/or push a token to the requesting device, such as the user system 204 via system network feeds and nodes through the network 201. The token may be stored in the memory 216 of the user system 204. The financial institution application 258 may then authorize or allow the token to be decrypted in the user system 204 memory, such that the user system 204 may utilize the credit card information associated with the token for acceptance and presentment of the new credit card on the digital wallet instantly after decryption. At that point, the credit card is functional on the digital wallet. As such, the user does not have to wait for a physical credit card to use the new card for transactions.

As illustrated in FIG. 2, the network system 206 is connected to the financial institution server 208 and is associated with a credit card processing institution. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of an network application 244.

In the embodiment illustrated in FIG. 1, the network application 244 provides, in some embodiments, token creation and distribution. In some embodiments the network application 244 may create and distribute a token for storage on the user system 204 and financial institution server 208. The token may include code therein that includes a virtual image of the card, card number, CVV number, expiration data, and other disclosures of the card required to utilize the card for digital wallet transactions. As such, the token may be stored in the memory 216 of the user system 204 and subsequently decrypted to be used by the user system 204 as a payment means via a digital wallet. The token may also be stored and decrypted by the financial institution system 208 for reconciliation and processing of the transaction at the financial institution post digital wallet transaction.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high level process flow illustrating the authorization and instant integration of a new credit card to a digital wallet process 10, in accordance with one embodiment of the present invention. As illustrated in block 102, the process is initiated by receiving an application for a credit card from a user. In some embodiments, the issuing financial institution may receive a user application for a new credit card via any channel, such as an electronic, mail, or via the banking network. In some embodiments, the system associated with the invention may be associated with the issuing financial institution and receive the user application for the new credit card.

Next, as illustrated in block 103, the user may be instantly approved for the credit card. The financial institution may approve the application after the application is submitted, the approval may be based on standardized credit card application acceptance criteria. In some embodiments, this approval may be instantaneous upon receiving the application.

As illustrated in block 104, the system may determine the user's online banking and digital wallet presence. As such, the system may determine if the user has an online banking application or account set up with the financial institution associated with the system. In some embodiments, the user may have applied for the new credit card via an online banking application. If the user is identified as having an online banking application presence, the system presents the new credit card to the user via the online banking platform for activation via his/her digital wallet. The presentation may be via the user's online or mobile banking interface or other electronic correspondence. In this way, the user may log into his/her online banking application using his/her user name and password authentication. Once the user is authenticated into an online banking platform, the system may provide information about accessing and authorizing the use of the credit card via the user's digital wallet instantaneously. In some embodiments, the system may recognize user selection of the credit card for instantaneous input onto his/her digital wallet. This selection may occur via the presentation of the credit card on the user online banking interface. Upon selection, the system may also determine the user's digital wallet presence. Typically, this includes a signature associated with the device associated with the digital wallet the user wishes to add the card to. As such, the system may receive information about the device associated with the digital wallet and the device used to log into the user's online banking application interface.

Next, as illustrated in block 106, the process 100 continues by identifying a user authentication and request for the activation of the newly approved credit card onto a digital wallet. In this way, the user may select the virtual card provided to the user's online banking application for activation and importation onto the user's digital wallet. As such, as soon as the user is approved for the credit card, the card is available as a visual card for use for purchases using a digital wallet. As such, the user does not have to wait for an approval process and subsequent receiving of the physical credit card in the mail before being able to use the card. In this way, the invention allows a user to apply for, receive approval, and use the credit card via a digital wallet, instantaneously.

Once the authentication and request for activation of the new credit card on the digital wallet is submitted, the system may determine a security confidence rating of the devices associated with the user, as illustrated in block 108. The security confidence rating is initiated by a security check of the device associated with the digital wallet in correlation with the device the user used to request for activation of the credit card onto the digital wallet. In some embodiments, the system may then initiate a security check on the devices. The security check generates a security confidence rating to confirm that the device requesting the new credit card to be implemented on the digital wallet and the device associated with the digital wallet are both devices associated with the user and are both not corrupted with viruses, malware, or the like. As such, the security check and subsequently generated security confidence rating ensures that misappropriation of the new credit card cannot occur. As such, the security check may, in some embodiments, access information about the requesting device and digital wallet device, based on the identifier of each device. The system may confirm the operating system of the device, the health of the device, and determine an IP address or location match between the devices the user uses to log into online banking applications and the requesting device.

In some embodiments, the security check will generate a security confidence rating, as illustrated in block 108. The security confidence rating rates the security of authorizing the new credit card to the digital wallet. As such, confirming within confidence that the digital wallet requesting the new credit card is associated with the user approved for the card. The security confidence rating and analytics associated therewith are further illustrated below with respect to FIG. 6.

Finally, as illustrated in block 110, once the system determines that the security rating is above the required threshold, the system may push a soft or virtual credit card to the user device for instant use via digital wallet. In some embodiments, the system may allow a token to be provided to the digital wallet. In other embodiments, the system may provide the token to the digital wallet. The token may be stored in the memory of the user device associated with the digital wallet. The token may include a virtual image of the card, card number, CVV number, expiration data, and other disclosures of the card required to utilize the card for digital wallet transactions. The user device may store the token until the user accesses his/her online banking application and/or his/her digital wallet. In this way, the system provides a token for the acceptance and presentment of the new credit card on the digital wallet instantly. At that point, the credit card is functional on the digital wallet. As such, the user does not have to wait for a physical credit card to use the new card for transactions.

FIG. 3 illustrates a process map for a standard insertion of a credit card to a digital wallet 300, in accordance with one embodiment of the present invention. As such, in a typical insertion of a credit card onto a digital wallet requires a user to receive a physical credit card. Subsequently, as illustrated in block 303 the user must input the sixteen digit credit card number, the CVV number, the expiration date, and other information associated with the credit card manually into the digital wallet. Next, once the user has inputted all of the required information, the user system may send a request to the credit card processing institute or credit network to import the physical credit card to the digital wallet, as illustrated in block 304. Next, once the credit card processing institution receives the "add card" request the institution sends the request to the issuing financial institution for approval, as illustrated in block 306. After sending the request over to the financial institution, the financial institution may then provide a decision bank to the network or credit card processing institution as to whether the credit card is eligible for digital wallet placement, as illustrated in block 308. Finally, the network may create a token and provide the token to the user's digital wallet and to the financial institution to record the token with the credit card account.

Then, the user may be able to utilize his/her credit card via a digital wallet. However, in this way, the user is required to have the physical card first, then request placement of that card onto a digital wallet, which requires interaction between an issuing financial institution and a credit card processing network.

FIG. 4 provides a process map illustrating system integration of credit card insertion into digital wallet based on the authorization and instant integration to digital wallet system 400, in accordance with one embodiment of the present invention. As illustrated in block 402, the process is initiated when a user requests or applies for a new credit card to use with a digital wallet. The request may be sent via any channel, such as electronic, mail, at a banking center, or the like.

The application for the new credit card is sent, over a network to the financial institution, at a financial institution server 208. Once the application is communicated over to the financial institution server 208, the financial institution server 208 determines approval and issuance of the new credit card, as illustrated in block 404. The financial institution may approve the application after the application is submitted, the approval may be based on standardized credit card application acceptance criteria. In some embodiments, this approval may be instantaneous upon receiving the application.

Once the financial institution server 208 approves the new credit card in block 404, the financial institution may communicate with the credit card processing institution or network system 206 information about the approval. The network system 206 that may create a token associated with the new credit card and the information provided about the same, as illustrated in block 406. The token is a security token or authentication token that is created by the network system 206 that includes information regarding the newly issued credit card such that the credit card may be used by a digital wallet to complete a transaction.

Once the network system 206 generates the token, it may be distributed to the user and the financial institution, as illustrated in block 408. When distributing it to the financial institution server 208, the financial institution server 208 may receive the token and associate the token with the approved credit card, as illustrated in block 412. In this way, when the user uses his/her new credit card via the digital wallet, the issuing financial institution may recognize the use of that credit card and authorize the virtual credit card for the transaction. In some embodiments, the token may be created and distributed to the user by the financial institution server 208.

In some embodiments, once the network system 206 generates the toke, it may be distributed to the user system 204 such that the user system 204 may utilize the credit card for the digital wallet. As illustrated in block 410 the user system 204 make store the token and make the credit card available in the digital wallet such that the user may utilize the credit card for one or more transactions.

FIG. 5 illustrates a detailed process flow for the authorization and instant integration of a new credit card to a digital wallet process 500, in accordance with one embodiment of the present invention. The process 500 is initiated when the system or issuing financial institution approves a new credit card, as illustrated in block 502. The issuing financial institution may receive a user application for a new credit card via any channel, such as an electronic, mail, or via the banking network. In some embodiments, the system associated with the invention may be associated with the issuing financial institution and receive the user application for the new credit card. The financial institution may approve the application after the application is submitted, the approval may be based on standardized credit card application acceptance criteria. In some embodiments, this approval may be instantaneous upon receiving the application. Next, the system may receive an indication that the user is or has access of an online banking platform, as illustrated in block 504. As illustrate in block 506, the system pay show the availability of the newly accepted credit card to users via the online banking platform for digital wallet use. As such, upon approval of the credit card, the system instantaneously provides the user with information about the approval and a means to activate the credit card to a digital wallet via the user online banking platform.

Next, the user may request addition of the new credit card to a mobile wallet. Once the request is made, the system, as illustrated in block 508, retrieves the identifications associated with the digital wallet. Furthermore, the system may, as illustrated in block 509 retrieve identification information associated with the device accessing the online banking platform. As such, the system may determine the device associated with the online banking session and the device associated with the digital wallet. The device associated with the digital wallet, in some embodiments, may be a mobile phone or mobile computing device with mobile or digital wallet capabilities thereon. The device associated with the online banking session may also be a mobile device, but could also include a desktop computer, bank branch computer, or the like. Furthermore, each device may include an identifier, such as a mobile telephone number, unique signature, or the like that is identified by the system that may identify the devices.

Next, as illustrated in block 510, the process 500 may continue by running a security check on the devices based on the user selection of the new credit card for instant digital wallet use. The security check generates a security confidence rating to confirm that the device requesting the new credit card to be implemented on the digital wallet and the device associated with the digital wallet are both devices associated with the user and are both not corrupted with viruses, malware, or the like.

Next, as illustrated in block 512, the system determines a security confidence rating for implementation of new credit card onto the digital wallet, where the security confidence rating is based on the security check. As such, once the security rating is above the required threshold, as illustrated in block 514, the system may push a token to the digital wallet device. The token may be stored on the digital wallet device and subsequently decrypted to allow use of the credit card on the digital wallet. At that point, the credit card is functional on the digital wallet. As such, the user does not have to wait for a physical credit card to use the new card for transactions.

FIG. 6 illustrates a process flow for the security check and security confidence rating for integration of new credit card onto digital wallet 600, in accordance with one embodiment of the present invention. The security check is initiated in block 602. The security check is done on one or more devices. These devices include the device associated with the digital wallet and the device the user used to authenticate and log into online banking. The device associated with the digital wallet, in some embodiments, may be a mobile phone or mobile computing device with mobile or digital wallet capabilities thereon. The device associated with the request may also be a mobile device, but could also include a desktop computer, bank branch computer, or the like.

Next as illustrated in block 604, the system may confirm an authorization match based on the user's online banking session log in information. As such, prior to uploading the new card to the user's digital wallet, the system may request a re-entry of the username and password of the user that is used for online banking session log in. In some embodiments, the authorization is the indication that the user has selected the new credit card to be implemented on his/her digital wallet.

Once confirmation of the authorization is received in block 604, the process 600 continues by retrieving user device information, as illustrated in block 605. User devices may, as stated above, include one or more devices including the device associated with the digital wallet and the device the user used to authenticate and log into online banking Retrieving user device information includes retrieving an identifier for each device, such as a mobile telephone number, unique signature, or the like. The system may identify the digital wallet device of the user and any devices that the user has utilized to request the insertion of the new credit card on the digital wallet and/or any devices that the user has utilized to access his/her online banking application.

Next, as illustrated in block 606, base one the device information, the system may retrieve the user device condition. The condition may include the current software, hardware, operating systems, or the like. The condition diagnostics allow the system to determine if the device can accept one or more tokens or uploads associated with the new card insertion into the digital wallet. As illustrated in block 608, the process 600 also determines device health. Device health may include system checks for determination of rooted, unrooted, rooted with malware, unrooted with malware, virus information, and the like.

The condition and health of the device confirms to the system that the digital wallet can support the uploading of the new credit card to the digital wallet and confirm that no malware or viruses are present that may piggyback or otherwise compromise or misappropriate that credit card.

Next the system may confirm the location of the user device relative to the user location, as illustrated in block 610. In this way, the system confirms that the digital wallet requesting the card is in co-localization of the user and/or co-localization with where the user has been. As such, this prevents misappropriation of the credit card to a digital wallet not associated with the user.

As illustrated in block 612 the system confirms condition and health of the devices as well as the co-localization. This confirmation generates a security confidence rating for the digital wallet. In some embodiments, as illustrated in block 614, if the security confidence rating is above a threshold, the user device is approved for the credit card and a token is provided to the digital wallet for storage and implementation of the credit card as a virtual credit card on the digital wallet. In this way, the user may now, in real-time after approval of the credit card application, use the credit card for a transaction via his/her mobile wallet without having to wait for a physical credit card to be received.

What is claimed is:

1. A system for authorization and instant integration approval, the system comprising:
   a memory device with non-transitory computer-readable program code stored thereon;
   a communication device;
   a processing device operatively coupled to the memory device and the communication device within a distributive network for the approval, wherein the processing device is configured to execute the computer-readable program code to:
      receive a credit card application from a user device associated with a user;
      in response to receiving the credit card application, instantly approve the credit card application based on a credit card application acceptance criteria stored in the memory device;
      communicate information regarding approval of the credit card application onto an online platform, wherein the online platform is accessible by the user via a username and password on one or more devices associated with the user;
      receive, based on communicating the information regarding approval of the credit card application to the online platform, via a distributive network, a request from the user device for integrating a credit card associated with the credit card application to a digital wallet;
      in response to receiving the request, identify a unique device identifier of the user device associated with the request;
      determine that the unique device identifier of the user device associated with the request matches at least one of one or more unique device identifiers associated with one or more devices used by the user to access the online platform;
      identify a first location of the user device associated with the request
      determine that the first location matches at least one of one or more locations associated with the one or more devices used by the user to access the online platform;
      identify a first IP address of the user device associated with the request;
      determine that the first IP address matches at least one of one or more IP addresses associated with the one or more devices used by the user to access the online platform;
      in response to determining that the unique device identifier matches at least one of the one or more unique device identifiers, the first location matches at least one of the one or more locations, and the first IP address matches at least one of the one or more IP addresses, transfer a notification to the user device associated with the unique device identifier to download a program code for monitoring and malware searching;
      initiate condition diagnostics by executing the downloaded program code on the user device associated with the unique device identifier to confirm device health, wherein the device health includes system checks for rooted or unrooted malware within the user device associated with the unique device identifier;
      generate a security confidence rating of the user device associated with the unique device identifier based on the condition diagnostics;
      determine that the security confidence rating of the user device associated with the unique device identifier is greater than a predetermined threshold security confidence rating;
      generate a token based on determining that the security rating is greater than the predetermined threshold security confidence rating, wherein the token comprises a credit card number, a CVV number, an expiration date, and a virtual image of the credit card for digital wallet insertion of the credit card; and
      in response to generating the token, instantly transfer the token to the user device associated with the unique device identifier for storage, wherein the token is decrypted for digital wallet integration and use for completing a transaction using the digital wallet.

2. The system of claim 1 further comprising receiving the credit card application from the user via one or more electronic channels and approving the credit card application instantaneously, wherein the credit card application is an application for a new credit card from a first time user.

3. The system of claim 1, wherein performing condition diagnostics further comprises determining the security confidence rating for integration of a new credit card associated with the credit card application to the digital wallet, wherein the security confidence rating confirms co-localization of the user and the digital wallet.

4. The system of claim 1, where the operation of identifying the unique device identifier of the user device associated with the request comprises identifying a telephone number associated with the user device.

5. The system of claim 1, wherein storing the token in the user device memory for digital wallet integration and decrypting the token further comprises storing the credit card associated with the approved credit card application instantaneously after approval in the digital wallet, such that no wait period is needed for use of the credit card for a transaction.

6. The system of claim 1, where the online platform is an online banking platform displaying information about accounts associated with the user authorized to access the online platform.

7. A computer program product for authorization and instant integration approval, the computer program product, within a distributive network, comprising at least one non-transitory computer-readable medium having computer-readable program code portions embodied therein, the computer-readable program code portions when executed by a processor causes the processor to perform operations of:

receiving a credit card application from a user device associated with a user;

in response to receiving the credit card application, instantly approving the credit card application based on a credit card application acceptance criteria stored in the memory device;

communicating information regarding approval of the credit card application onto an online platform, wherein the online platform is accessible by the user via a username and password on one or more devices associated with the user;

receiving, based on communicating the information regarding approval of the credit card application to the online platform, via a distributive network, a request from the user device for integrating a credit card associated with the credit application to a digital wallet;

in response to receiving the request, identifying, a unique device identifier of the user device associated with the request;

determining that the unique device identifier of the user device associated with the request matches at least one of one or more unique device identifiers associated with one or more devices used by the user to access the online platform;

identifying a first location of the user device associated with the request;

determining that the first location matches at least one of one or more locations associated with the one or more devices used by the user to access the online platform;

identifying a first IP address of the user device associated with the request;

determining that the first IP address matches at least one of one or more IP addresses associated with the one or more devices used by the user to access the online platform;

in response to determining that the unique device identifier matches at least one of the one or more unique device identifiers, the first location matches at least one of the one or more locations, and the first IP address matches at least one of the one or more IP addresses, transferring a notification to the user device associated with the unique device identifier to download a program code for monitoring and malware searching;

initiating condition diagnostics by executing the downloaded program code on the user device associated with the unique device identifier to confirm device health, wherein the device health includes system checks for rooted or unrooted malware within the user device associated with the unique device identifier;

generating a security confidence rating of the user device associated with the unique device identifier based on the condition diagnostics;

determining that the security confidence rating of the user device associated with the unique device identifier is greater than a predetermined threshold security confidence rating;

generating a token based on determining that the security rating is greater than the predetermined threshold security confidence rating, wherein the token comprises a credit card number, a CVV number, an expiration date, and a virtual image of the credit card for digital wallet insertion of the credit card; and in response to generating the token, instantly transferring the token to the user device for storage, wherein the the token is decrypted for digital wallet integration and use for completing a transaction using the digital wallet.

8. The computer program product of claim 7 further comprising an executable portion configured for receiving the credit card application from the user via one or more electronic channels and approving the credit card application instantaneously, wherein the credit card application is an application for a new credit card from a first time user.

9. The computer program product of claim 7, wherein performing condition diagnostics further comprise determining the security confidence rating for integration of a new credit card associated with the credit card application to the digital wallet, wherein the security confidence rating confirms co-localization of the user.

10. The computer program product of claim 7, where the operation of identifying the unique device identifier of the user device associated with the request comprises identifying a telephone number associated with the user device.

11. The computer program product of claim 7, wherein storing the token in the user device memory for digital wallet integration and decrypting the token further comprises storing the credit card associated with the approved credit card application instantaneously after approval in the digital wallet, such that no wait period is needed for use of the credit card for a transaction.

12. The computer program product of claim 7, where the online platform is an online banking platform displaying information about accounts associated with the user authorized to access the online platform.

13. A computer-implemented method for authorization and instant integration approval, the method comprising:

providing a computing system within a distributive network for the authorization and instant integration approval for a digital wallet, comprising a computer processing device and a non-transitory computer readable medium, where the computer readable medium comprises configured computer program instruction code, such that when said instruction code is operated by said computer processing device, said computer processing device performs the following operations:

receiving a credit card application from a user device associated with a user;

in response to receiving the credit card application, instantly approving the credit card application based on a credit card application acceptance criteria stored in the memory device;

communicating information regarding approval of the credit card application onto an online platform, wherein the online platform is accessible by the user via a username and password on one or more devices associated with the user;

receiving, based on communicating the information regarding approval of the credit card application to the online platform, via a distributive network, a request from the user device for integrating a credit card associated with the credit application to a digital wallet;

in response to receiving the request, identifying, a unique device identifier of the user device associated with the request;

determining that the unique device identifier of the user device associated with the request matches at least one of one or more unique device identifiers associated with one or more devices used by the user to access the online platform;

identifying a first location of the user device associated with the request;

determining that the first location matches at least one of one or more locations associated with the one or more devices used by the user to access the online platform;

identifying a first IP address of the user device associated with the request;

determining that the first IP address matches at least one of one or more IP addresses associated with the one or more devices used by the user to access the online platform;

in response to determining that the unique device identifier matches at least one of the one or more unique device identifiers, the first location matches at least one of the one or more locations, and the first IP address matches at least one of the one or more IP addresses, transferring a notification to the user device associated with the unique device identifier to download a program code for monitoring and malware searching;

initiating condition diagnostics by executing the downloaded program code on the user device associated with the unique device identifier to confirm device health, wherein the device health includes system checks for rooted or unrooted malware within the user device associated with the unique device identifier;

generating a security confidence rating of the user device associated with the unique device identifier based on the condition diagnostics;

determining that the security confidence rating of the user device associated with the unique device identifier is greater than a predetermined threshold security confidence rating;

generating a token based on determining that the security rating is greater than the predetermined threshold security confidence rating, wherein the token comprises a credit card number, a CVV number, an expiration date, and a virtual image of the credit card for digital wallet insertion of the credit card; and in response to generating the token, instantly transferring the token to the user device for storage, wherein the the token is decrypted for digital wallet integration and use for completing a transaction using the digital wallet.

14. The computer implemented method of claim 13 further comprising receiving the credit card application from the user via one or more electronic channels and approving the credit card application instantaneously, wherein the credit card application is an application for a new credit card from a first time user.

15. The computer implemented method of claim 13, wherein performing condition diagnostics further comprises determining the security confidence rating for integration of a new credit card associated with the credit card application to the digital wallet, wherein the security confidence rating confirms co-localization of the user and the digital wallet.

16. The computer implemented method of claim 13, where the operation of identifying the unique device identifier of the user device associated with the request comprises identifying a telephone number associated with the user device.

17. The computer implemented method of claim 13, wherein storing the token in the user device memory for digital wallet integration and decrypting the token further comprises storing the credit card associated with the approved credit card application instantaneously after approval in the digital wallet, such that no wait period is needed for use of the virtual credit card for a transaction.

* * * * *